(12) United States Patent
Markunas et al.

(10) Patent No.: US 7,034,497 B2
(45) Date of Patent: Apr. 25, 2006

(54) CARRIER INJECTION SENSORLESS CONTROL OF AIRCRAFT VARIABLE FREQUENCY WOUND FIELD SYNCHRONOUS STARTER/GENERATORS

(75) Inventors: Albert L. Markunas, Roscoe, IL (US); Vijay K. Maddali, Rockford, IL (US); William J. Peterson, Rockton, IL (US); Charles Romenesko, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 66 days.

(21) Appl. No.: 10/951,055

(22) Filed: Sep. 22, 2004

(65) Prior Publication Data

US 2006/0061319 A1    Mar. 23, 2006

(51) Int. Cl.
*H02P 1/46* (2006.01)

(52) U.S. Cl. ............... 318/712; 318/432; 318/434; 318/439

(58) Field of Classification Search ............... 318/661, 318/254, 138, 439, 715, 432, 434, 712
See application file for complete search history.

(56) References Cited

U.S. PATENT DOCUMENTS 6,498,451 B1 * 12/2002 Boules et al. ............... 318/661
2004/0080229 A1 * 4/2004 Haner ........................ 310/166

* cited by examiner

*Primary Examiner*—Karen Masih
(74) *Attorney, Agent, or Firm*—Stephen G. Mican (57) ABSTRACT

A carrier injection sensorless (CIS) starting control system that is capable of determining the angular position and velocity of a rotor for a wound field synchronous machine at or near rest and comprises north-south pole determination and a variable or dual frequency carrier signal for improved performance throughout the start sequence for the machine.

13 Claims, 5 Drawing Sheets

CARRIER INJECTION SENSORLESS CONTROL OF AIRCRAFT VARIABLE FREQUENCY WOUND FIELD SYNCHRONOUS STARTER/GENERATORS

FIELD OF THE INVENTION

The invention relates to rotor angular position and velocity sensing systems for dynamoelectric machines, and more particularly to an improved starting control system that resolves the position of a rotor for a wound field synchronous machine using a carrier injection sensorless position sensing system at or near standstill.

BACKGROUND OF THE INVENTION

Modern aircraft, both commercial and military, are migrating to more electric architectures that integrate the main and auxiliary engine start functions with the electric power generating equipment. Conventional brushless, wound field synchronous generators are among the candidate machines for this new class of starter/generator and are the logical choice for modern variable frequency (VF) alternating current (AC) electric system architectures. These modern aircraft starter/generators represent a class of variable speed motor drives in the start mode of operation and use solid-state power converters to process typically high potential direct current (DC) electric power into VF AC electric power suitable for driving the variable speed AC electric machine. Typical of all variable speed synchronous motor drives, the position of the motor rotor is required to control the solid-state power converter to meet motor performance requirements.

A resolver mounted to the starter/generator rotor provides this required rotor position information but it has been identified as imposing size, weight, and complexity or unreliability penalties. Thus, it is desirable to provide the electric start function in a self-sensing or sensorless manner, that is, without a resolver or other overt rotor position sensing means. Additionally, these starter/generators are sized for worst case starting conditions that may require a plurality of machines to start a single main engine at cold day conditions. It is thus required in some applications to parallel a multiplicity of starter/generators to provide full rated torque from each of these starter/generators at standstill.

Many sensorless schemes have been invented over the past 20 to 30 years to enable sensorless operation of many different classes of electric motors under a variety of different operating conditions. At rotor standstill or low speed there is insufficient back electromotive force (EMF) generated in a dynamoelectric machine to enable an accurate estimate of rotor position using only passive measurement of terminal potentials and currents. Some means must be provided to stimulate the machine in order to extract rotor position information. Many alternative schemes have been reported in the technical literature over the years.

Stimulation can be applied to either the rotor or the stator, it can be either transient or continuous, and it may be of different frequencies. Nonetheless, all the reported approaches require some means to stimulate the machine and some means to interpret or demodulate the stimulation response in order to provide an estimate of the rotor position. One advantageous approach is described in U.S. Pat. No. 5,585,709 by Jansen et al., herein incorporated by reference.

Jansen et al. describes a carrier injection sensorless (CIS) method of estimating the position and velocity of the rotor of a dynamoelectric machine. CIS works by applying a high frequency excitation signal with an electrical current or potential rotating waveform to the dynamoelectric machine at a high enough frequency that it sweeps around the stator faster than the rotor is turning, thus "viewing" the rotor from all angles. This "viewing" is manifested in measuring the resulting rotating current or potential waveform, which contains information about the rotor due to rotor position dependent differences in the equivalent magnetic circuit of the dynamoelectric machine.

If the rotating current waveform at the machine terminals is transformed to its stationary two-axis equivalent ($\alpha\beta$) and x-y plotted, a non-circular orbit is seen that rotates with the rotor. This is the electromagnetic image of the dynamoelectric machine and in general, each machine design has its own unique image. This technique works with any dynamoelectric machine that has rotor saliencies that result in a change in impedance as seen at the stator windings to the high frequency excitation signal.

Although the CIS technique described in Jansen et al. allows estimation of the position of a rotor pole, either "north" or "south", it does not inherently allow the determination of which pole's position is estimated. This could give rise to 180 electrical degree errors in position estimation, and such error can be very undesirable.

A means for north-south pole determination using the CIS technique for wound field synchronous machines is described in a pending patent application by Markunas et al., U.S. Ser. No. 10/930,629, filed 31 Aug. 2004, owned by the assignee of this application and incorporated by reference. In Markunas et al., the means for north-south pole discrimination exists in the field current rectification provided by the rotating rectifier in the field circuit of the wound field synchronous machine. In essence, the rotating rectifier diodes produce an asymmetry in the effective d-axis impedance as viewed from the stator. The d-axis looks different when the rotating rectifier is forward biased than when it is reverse biased. This rectification induces second and higher order harmonics in the d-axis currents for carrier injection. This asymmetry only exists when the wound field synchronous machine is unexcited. As soon as excitation is applied, the rotating rectifier is forward biased, eliminating the asymmetry.

Markunas et al. utilises the positively rotating components ($+2\omega_c t$) of the carrier second harmonics that contain additional rotor position information before field excitation. This information is used as a north-south pole indicator to determine if the CIS system has locked onto a north or south pole of the rotor. One problem with this technique is that the best carrier frequency for determining a north pole from a south pole is in the range of approximately 50 to 150 Hz for high power aircraft brushless synchronous starter/generators such as for aircraft of new design. The best carrier frequency for the remaining start sequence is significantly higher, on the order of 300 to 1200 Hz.

SUMMARY OF THE INVENTION

The invention comprises a carrier injection sensorless (CIS) starting control system that is capable of determining the angular position and velocity of a rotor for a wound field synchronous machine at or near rest and comprises north-south pole determination and a variable or dual frequency carrier signal for improved performance throughout the start sequence for the machine.

One preferred embodiment of the invention comprises method of determining the angular position and velocity of a rotor for a polyphase alternating current (AC) wound field synchronous machine at or near rest that is driven by a motor controller that comprises a carrier injection sensorless (CIS) position sensing system, the rotor being excited by power generated by an exciter through a rotating rectifier, comprising the steps of: generating polyphase AC power for the machine that has a power frequency representative of rotor angular velocity and current representative of torque; generating a variable frequency polyphase AC carrier signal that has a frequency substantially higher than the power frequency; injecting the carrier signal until electromagnetic transients die away; activating a rotor position observer and phase lock to a rotor pole, initially estimating rotor angular velocity and position within a narrow low velocity range; establishing north-south pole alignment and correcting the estimated angle; increasing the frequency of the carrier signal using a controlled ramp; activating the motor controller at zero commanded torque; applying excitation to the exciter; and applying a ramped torque command from zero to full torque to the motor controller to accelerate.

Another preferred embodiment of the invention comprises a method of determining the angular position and velocity of a rotor for a polyphase alternating current (AC) wound field synchronous machine at or near rest that is driven by a motor controller that comprises a carrier injection sensorless (CIS) position sensing system, the rotor being excited by power generated by an exciter through a rotating rectifier, comprising the steps of: generating polyphase AC power for the machine that has a power frequency representative of rotor angular velocity and current representative of torque; generating a dual frequency polyphase AC carrier signal with lower and higher frequencies that are substantially higher than the power frequency; injecting the carrier signal until electromagnetic transients die away; activating a rotor position observer and phase lock to a rotor pole, initially estimating rotor angular velocity and position within a narrow low velocity range; establishing north-south pole alignment and correcting the estimated angle; terminating the lower frequency of the carrier signal; activating the motor controller at zero commanded torque; applying excitation to the exciter; and applying a ramped torque command from zero to full torque to the motor controller to accelerate.

DETAILED DESCRIPTION OF THE INVENTION

Figure 1:
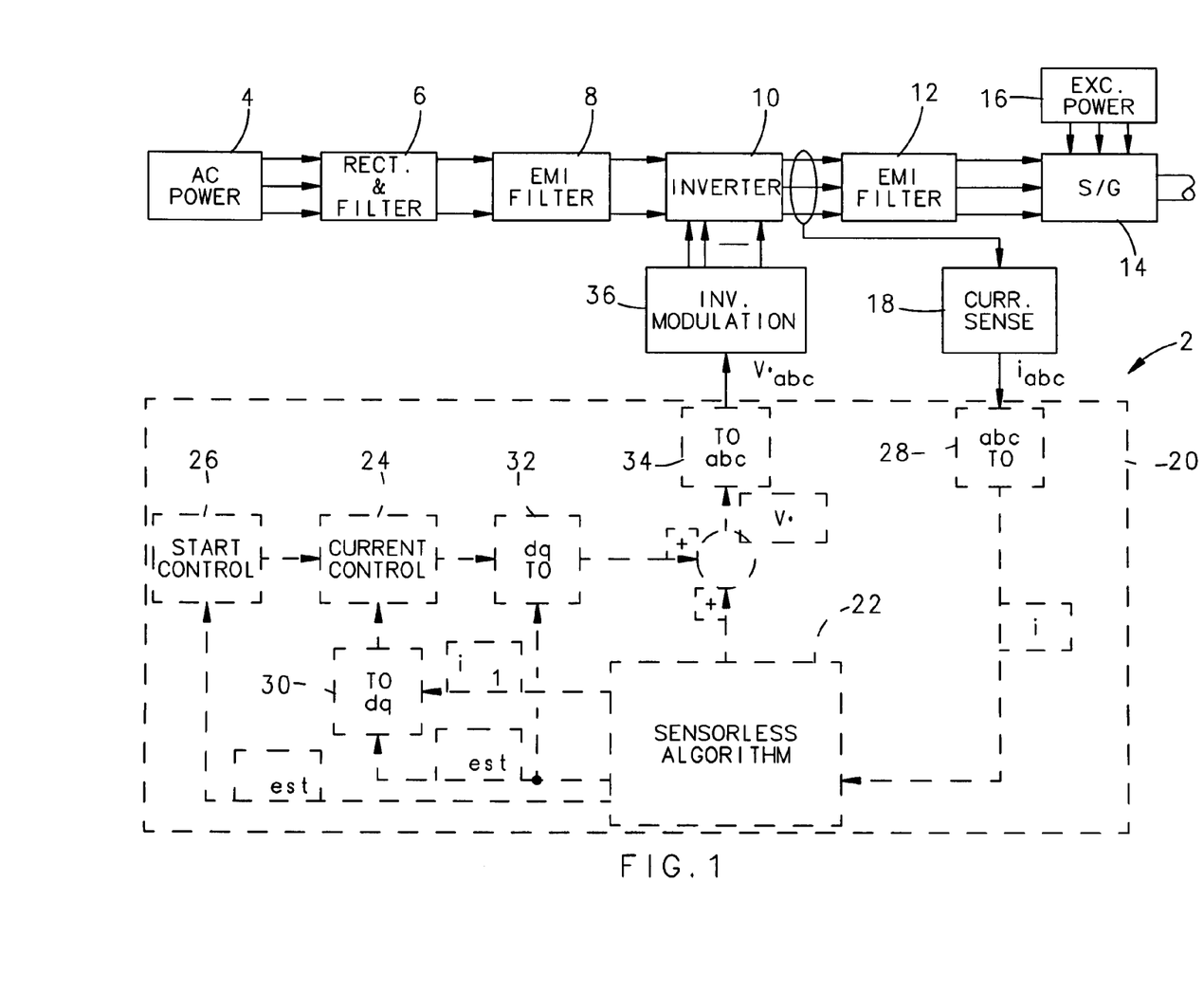
FIG. 1 shows a high level block diagram for the rotating vector carrier injection sensorless (CIS) control system 2 according to the invention as applied to an aircraft brushless wound field synchronous starter/generator.

FIG. 1 shows a high level block diagram for the rotating vector carrier injection sensorless (CIS) control system 2 as applied to an aircraft brushless wound field synchronous starter/generator. A polyphase AC power source 4 generates AC power, typically three-phase. A rectifier-filter 6 converts the AC power to filtered high potential DC power. A first electro-magnetic interference (EMI) filter 8 removes extraneous high frequency noise from the DC power. An inverter 10 converts the DC power to VF polyphase AC, typically three-phase. A second EMI filter 12 removes extraneous high frequency noise from the VF AC power. The filtered VF AC power feeds a starter/generator 14. In order to provide excitation for the main field of the starter/generator 14 at standstill, the starter/generator requires a three-phase exciter (not shown). This three-phase exciter operates on three-phase AC power from an exciter power source 16, typically an aircraft AC bus. The topology described herein incorporates the well-known Field Oriented Control (FOC) closed loop control of starter/generator currents to control the torque delivered by the starter/generator. A current sensing system 18 senses and anti-alias filters the three-phase VF AC currents from the inverter and derives the current feedback signal $i_{abc}$ required for closed loop current control. Alternatively, the current sensing system 18 can sense the starter/generator 14 currents directly. However, in typical systems the inverter 10 has current sensors that are readily available. Current feedback signal $I_{abc}$ feeds an input of an FOC function rotor position estimation function 20 that comprises a sensorless algorithm block 22 according to a preferred embodiment of the invention.

A conventional FOC current control block 24 transforms current regulator loops from the physical or phase variable (abc) representation into the rotor synchronous reference frame (dq0). In this coordinate system, the d-axis current is the field producing current and the q-axis current is the torque producing current. A start control block 26 generates the two current commands for the FOC block 24 based on some higher-level algorithm such as a speed control loop or a scheduled torque vs. speed profile. The measured currents are usually transformed from abc variables into dq variables in two steps, shown as an abc to $\alpha\beta$ transformation block 28 and an $\alpha\beta$ to dq transformation block 30. The internal functioning of the FOC block 24 is well known by those skilled in the art. The outputs from the FOC block 24 are commanded d-axis and q-axis potentials that are then transformed from dq to $\alpha\beta$ by a dq to $\alpha\beta$ transformation block 32 and $\alpha\beta$ to abc transformation block 34 before being sent to an inverter modulation function 36. Both the $\alpha\beta$ to dq transformation block 30 and the dq to $\alpha\beta$ transformation block 32 require the rotor position measured in electrical degrees. For a sensored application this information is typically supplied by a resolver or some other rotor position measurement means. To this point all functions described are well known and widely practiced in the motor control field. Sensorless operation of the starter/generator 14 entails removing the resolver or other physical rotor position sensing means and providing an estimate of true rotor position using measurements, like potentials and currents, typically required for other starter/generator functions.

Figure 2:
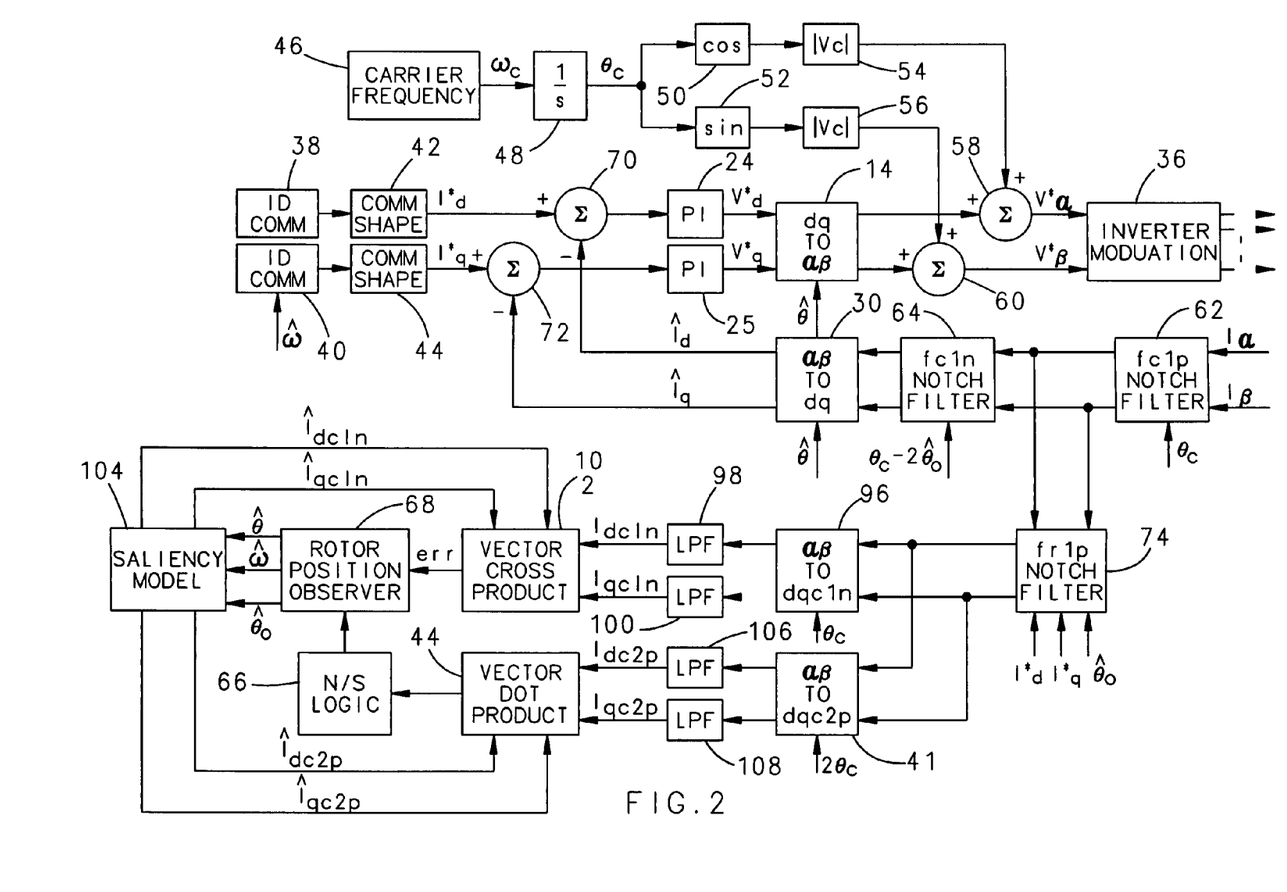
FIG. 2 shows the sensorless algorithm block according to the invention that utilises CIS rotating vector carrier injection sensorless technology.

FIG. 2 shows the sensorless algorithm block 22 in more detail, including some blocks normally attributed to FOC operation for clarity that utilises CIS rotating vector carrier injection sensorless technology as described in Jansen et al. and Markunas et al. The essence of this technology is that a carrier frequency potential is injected into the starter/generator by adding the carrier potential commands in $\alpha\beta$ coordinates to the potential commands from the FOC. The carrier frequency is significantly higher than the fundamental electrical frequency such that the combined action of the two carrier potentials produces a rotating potential waveform that rotates faster than the rotor. This potential waveform induces a current waveform, also rotating faster than the rotor and including terms dependent on the effective rotor saliency or asymmetry that contain rotor information. This rotor position information is extracted from the starter/generator currents using digital signal processing. Additionally, the fundamental rotating vector carrier injection sensorless technology only identifies a rotor pole and requires additional information to ascertain a north from a south pole.

The start control block 26 in FIG. 1 generates d-axis current command 38 and q-axis current command 40 shown in FIG. 2. These commands are feed through command shaping filters 42 and 44, respectively, to limit both the first and second derivatives of the current commands sent to the FOC. This is a new feature of the invention applied to the basic CIS and is required to avoid introducing transients to the sensorless operation that may cause it to lose lock with the rotor. From the command shaping filters 42, 44, the two current commands 38, 40 are sent to the FOC structure.

A carrier frequency block 46 generates a carrier frequency signal. According to one implementation of the invention, the carrier frequency signal is variable for this application, also an enhancement to the basic CIS technology as described in Jansen et al. and Markunas et al. As described in Markunas et al., the best carrier frequency for determining a north pole from a south pole is in the range of approximately 50 to 150 Hz. This depends on the inductances/reactances of the starter/generator 14, but it is generally in this range for high power aircraft brushless synchronous starter/generators such as for aircraft of new design. The best carrier frequency for the remaining start sequence is significantly higher, on the order of 300 to 1200 Hz. Thus, the frequency of the carrier frequency signal is tailored to best suit the needs of the algorithm during the start sequence. The shape or profile of the carrier frequency is typically time dependent with a general "S" shape to provide a smooth variation. An integrator 48 integrates the carrier frequency signal to yield the carrier angle that is passed to cosine block 50 and sine block 52. The two signals from the output of the cosine block 50 and the sine block 52 are passed through scaling blocks 54 and 56, respectively, to set the potential amplitude of the carrier injection, |Vc|. These carrier potential commands are then summed in summers 58 and 60, respectively, with the potential commands from the FOC.

Another embodiment of the invention uses two separate carrier frequency signals instead of the single variable carrier frequency signal described above when warranted. This approach entails adding an additional synchronous frame notch filter to the algorithm elements shown in FIG. 2. This dual carrier frequency signal approach is used for applications requiring a higher carrier frequency signal for good rotor pole lock from the very beginning of operation and a lower carrier frequency signal for good NS detection at the same time. Once north-south determination is made, the lower carrier frequency signal is shut off and the algorithm reverts structurally to that shown in FIG. 2.

The measured currents in general contain both fundamental or torque producing currents and carrier frequency currents. Due to the rotor saliency the carrier frequency currents contain a positively rotating component (rotating in the same direction as the carrier potential waveform) at exactly the carrier frequency and a typically smaller negatively rotating component (rotating in the opposite direction as the carrier potential waveform) at carrier frequency minus twice rotor frequency. The positive sequence components contain no rotor position information. The negative sequence components contain the rotor position information. After being transformed to αβ coordinates the total stator currents are passed to a first synchronous frame notch filter 62 at the carrier positive sequence frequency, fc1p=fc (carrier 1st harmonic or fundamental frequency, positive sequence). The notch filter 62 essentially eliminates the carrier positive sequence components from the two currents without affecting either the fundamental frequency components or the carrier negative sequence components of the carrier signal. From this point, the signals split.

The first path is the current feedback path used for FOC and it should not have any carrier frequency signal content for correct FOC function. The signals from the fc1p Notch Filter 56 are passed to a second synchronous notch filter 64 at the carrier negative sequence frequency, fc1n=−fc+2fr (carrier 1st harmonic or fundamental frequency, negative sequence). This synchronous frame notch filter 64 uses the carrier angle minus twice the original estimated rotor position, rather than the estimated rotor position following north-south correction. The reason for this is that when a north-south (N/S) logic block 66 has detected that a rotor position observer 68 has locked on to a south pole, the rotor position estimate is corrected by 180 degrees in a step-wise fashion. This step change in the rotor position estimate would cause a step disturbance to the synchronous frame notch filter 64, upsetting the sensorless algorithm and potentially causing it to lose lock. By using the original uncorrected rotor position estimate instead, this potentially detrimental disturbance is avoided. The use of the original rotor position estimate represents an improvement to the basic CIS technology. Following the filter 64, all carrier frequency signal components have been rejected such that the remaining signal should be primarily fundamental electrical frequency plus some additional small harmonic content. From this point the currents are used by the FOC in the normal manner, passing through the αβ to dq transformation block 30 before going to current error summers 70, 72 in the FOC algorithm. Use of the exact carrier negative sequence frequency at negative (fc−2fr) is different from what is reported in the literature. In the application reported to date, fc is typically so much higher than the fundamental electrical frequency, fr, that the difference is negligible. Given the high power levels typical of aircraft starter/generators and the attendant lower switching frequencies (due to the high power, that is, high potential and high current), the difference between fc and fc−2fr is significant and use of same in the fc1n synchronous frame notch filter represents an improvement.

Figure 3:
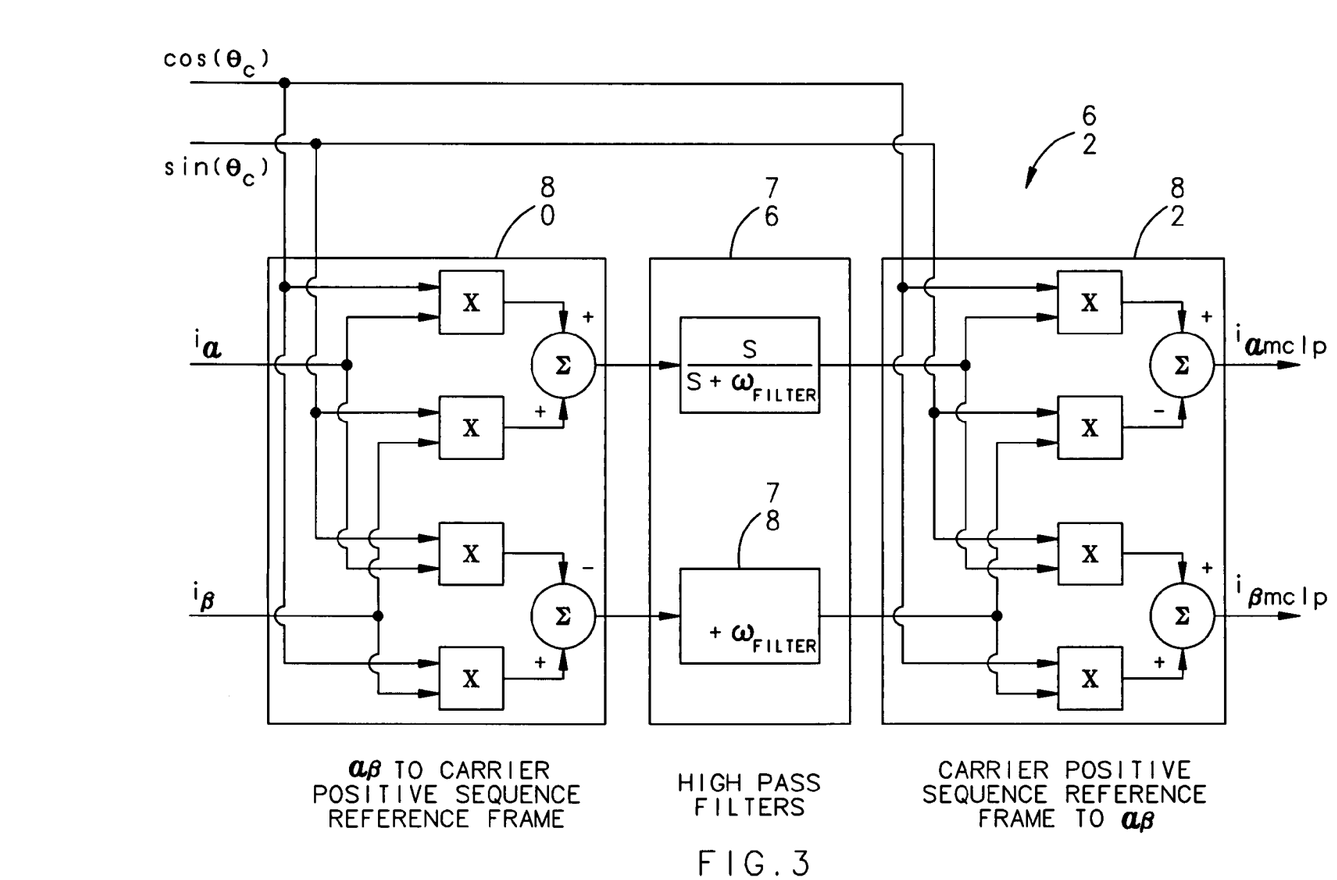
FIG. 3 shows a conventional synchronous reference frame notch filter.

The second current signal path from the fc1p notch filter block 62 is the one that is used to estimate rotor position. At this point, the current signals still contain fundamental electrical frequency content. A fr1p notch filter block 74 is another synchronous reference notch filter with the distinction that it is a tracking filter. There is typically a trade-off between the sharpness of the notch for rejecting signals and the transient response of the notch filter. The conventional synchronous reference frame notch filter is shown in FIG. 3, which is the fc1p Notch Filter 62 for reference. As can be seen the technique involves transforming the signals into the synchronous reference frame of that frequency that is to be rejected. High pass filters 76, 78 following a αβ to carrier positive sequence reference frame transformation 80 block DC content or the frequency being rejected. The high pass filters 76, 78 allow frequencies far from the notch frequency to pass through unaffected. After filtration by the high pass filters 76, 78, the remaining signals are back-transformed to the absolute frequency domain by a carrier positive sequence reference frame to αβ transformation 82, resulting in notching out the desired frequency content, fc1p in this case.

Figure 4:
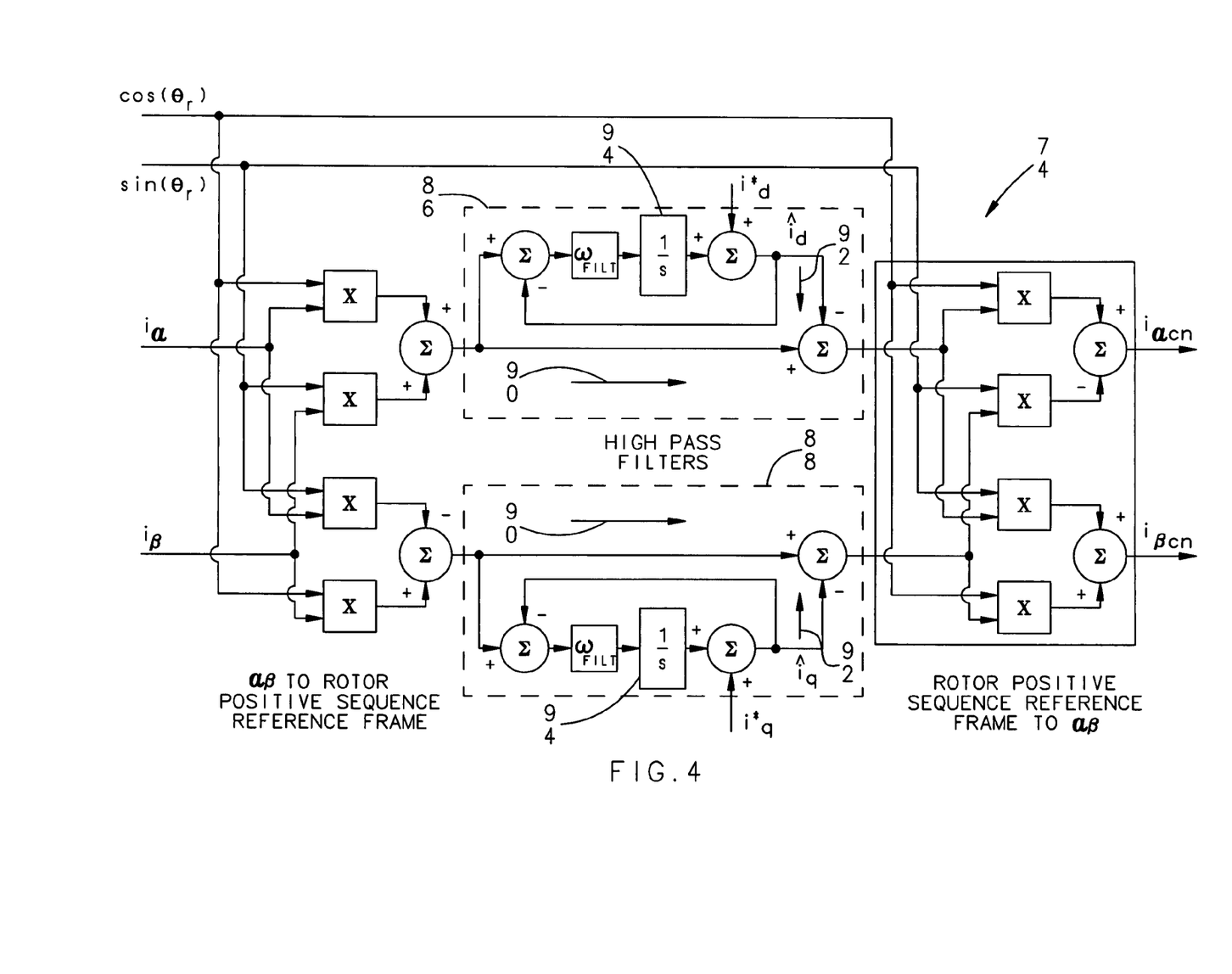
FIG. 4 shows an improved power frequency synchronous reference frame notch filter according to the invention.

With reference to FIG. 4, the same functions as for conventional synchronous frame notch filters are implemented in a slightly different form for the fr1p notch filter 74. The transformation into the rotor fundamental positive sequence reference frame by an αβ to Rotor Positive sequence reference frame transformation 84 is the same in form as the transformation 80. However, high pass filters 86, 88 are each decomposed into two parallel paths, one a direct feed through path 90 and a second lagged path 92, the output of which is subtracted from the direct feed through path 90 to form each of the high pass filters 86,88. The output of an integrator 94 in each lagged path 92 is actually an estimate of the signal at the frequency being notched out. The selectivity of this estimate is determined by the filter frequency wf. Smaller filter frequency translates into higher frequency selectivity or a sharper notch. Prior to being subtracted from the direct feed through path the commanded currents from the FOC are added to the lagged path signals. To the extent that the FOC is a high bandwidth current loop, the two current loop commands are faithfully followed by the actual currents and adding the current commands to the lagged path forces the currents thus estimated to follow the actual fundamental electrical frequency currents closely. This enhancement to the basic synchronous frame notch filter represents an expansion to the technology. The new tracking synchronous frame notch filter 74 enables rejecting the fundamental electric frequency content from the current signals in the sensorless algorithm path during periods when the current commands and thus the currents are changing rapidly. This feature greatly enhances the pole lock capability of the algorithm to changing fundamental frequency currents that are typically many times larger than the carrier negative sequence currents. Too slow a response from the fc1p notch filter 74 causes the sensorless algorithm to lose lock.

The fc1p Notch Filter 62 also uses the original rotor position estimate to avoid any disturbance to the sensorless algorithm when the rotor position is corrected to true north position from south. The reasons for this approach are explained in the paragraph describing the carrier negative sequence synchronous frame notch filter above. Again, the use of the original rotor position estimate represents an improvement to the basic technology.

Following the fc1p Notch Filter 62 the signals again split. The top path is used to provide the rotor pole position information, either north or south pole. The bottom path is used to provide north/south pole information used to correct the rotor pole position estimate to give the position of the rotor north pole (one of the rotor north poles if the starter/generator has more than 2 poles). For the top path, the signals are first transformed by an αβ to dq transformation block 96 into the carrier negative sequence reference frame (rotating negatively at carrier frequency). Since both the carrier positive sequence and the rotor fundamental positive sequence components have been removed from the signals, what remains following low pass filtering by low pass filters 98, 100 to clean up any remaining unwanted frequency content is essentially carrier negative sequence content at a frequency of −fc+2fr. After transforming to the carrier negative sequence reference frame, the dominant frequency content is 2fr or twice the fundamental electrical frequency rotating positively (same direction as the rotor). The two transformed currents, Idc1n and Iqc1n, are used to drive the rotor position observer 68 as reported in the literature on rotating vector carrier injection sensorless technology. The rotor position observer 68 is driven by the output of a vector cross product block 102. The inputs to the vector cross product block 102 are the two filtered and transformed currents, Idc1n and Iqc1n, and the estimates of these same two currents produced in a saliency model 104. The output of the vector cross product 102 is proportional to the product of the magnitudes of the two effective current vectors multiplied by the sine of the angle between them, just like the mathematical vector cross product. For this function to give an accurate estimate of the true rotor pole position, the saliency model 104 has to give accurate estimates of Idc1n and Iqc1n (so designated by the hat symbol) given the estimated rotor position from the rotor position observer 68. The values of the two currents in the negative sequence reference frame depend on the starter/generator carrier negative sequence impedance. The carrier negative sequence impedance gives the magnitude of the carrier injected potential (|Vc|) divided by the magnitude of the currents and the phase of the currents relative to the carrier negatively rotating reference frame both as a function of carrier frequency. Phase is more important than magnitude as the signals from the saliency model 104 are typically normalized. Once determined by either analysis or test or a combination of the two, the phase information is embedded in the saliency model 104 for estimation purposes. This phase information is machine specific and is quite different for aircraft brushless wound field synchronous starter/generators than the class of machines for which this technology has been applied.

Figure 5:
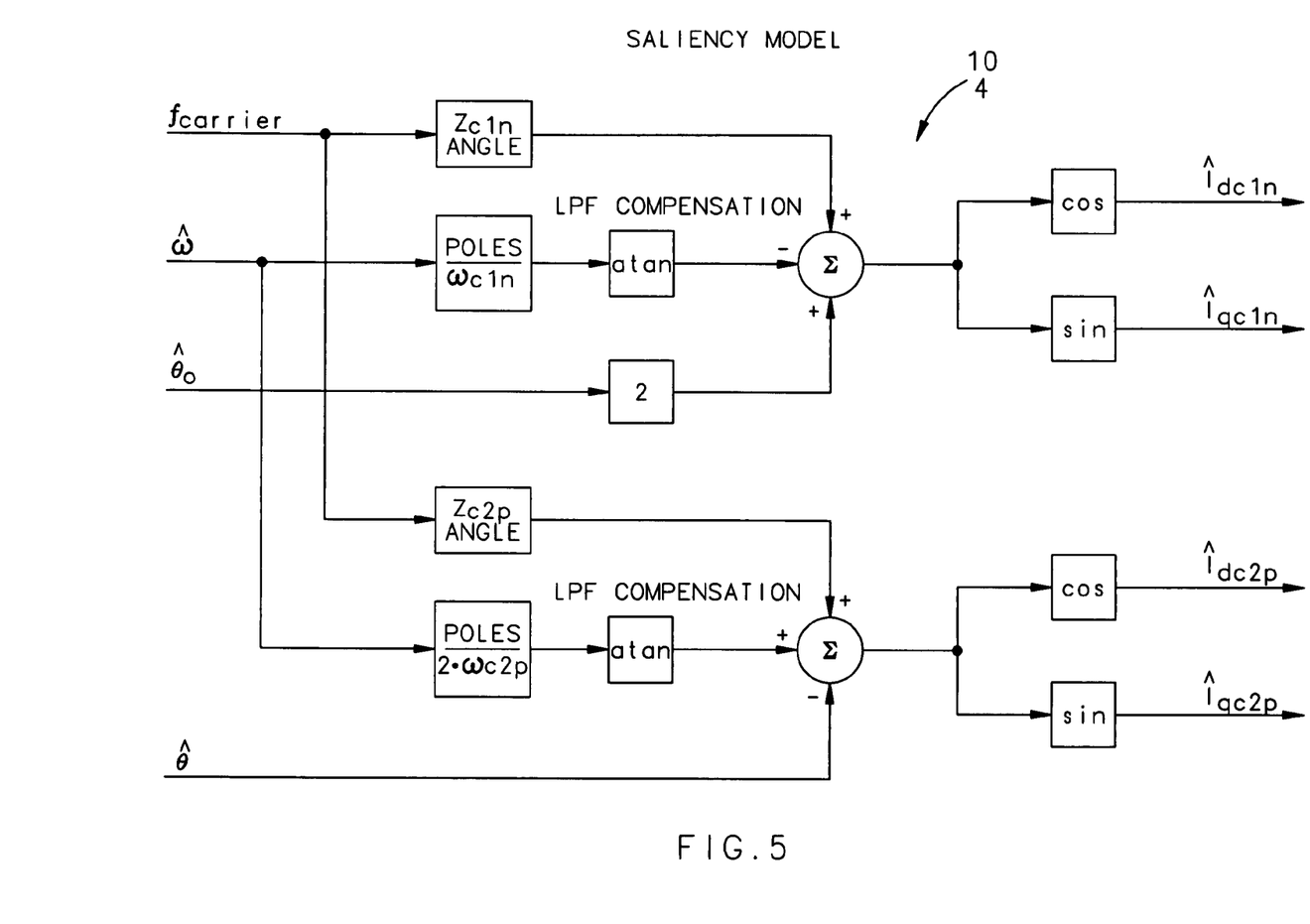
FIG. 5 shows the detail of one possible implementation of a saliency model according to the invention to produce estimates of the $\alpha$ and $\beta$ currents used for both rotor pole lock and north-south detection.

FIG. 5 shows the detail of one possible implementation of the saliency model 104 to produce estimates of the α and β currents used for both rotor pole lock and north-south detection. The starter/generator current estimates used for rotor pole lock are in general functions of the carrier frequency, the estimated rotor frequency and the original estimated rotor position. The current estimates used for north-south determination are also functions of the carrier frequency and the estimated rotor frequency, but are functions of the corrected estimated rotor position, in place of the original rotor position estimate. This use of the corrected rotor position estimate causes a latching action to prevent toggling the north-south detection. That is, once the correction has been made the detection algorithm detects a north pole lock from that point forward. Both major paths in the saliency model have a correction for low pass filters 98, 100, 106, 108 used to remove extraneous harmonics from the digital signal processed currents in FIG. 4. The phase character of the low pass filters 98, 100, 106, 108 is easily calculated and added to the pertinent impedance angle and the appropriate estimated rotor position before generating the estimated currents waveforms. Note that other implementations could be used. The important feature is that both sets of current estimates are functions of the estimated rotor position, the carrier frequency, and the estimated rotor angular velocity or frequency. This functional dependence represents an expansion to the basic technology. The bottom path following the fr1p Notch Filter 74 in FIG. 4 implements the preferred approach to north-south determination as described in Markunas et al.

The application of the above-described CIS technology to an aircraft brushless wound field variable frequency synchronous starter/generator for use in the start sequence of a main engine in an aircraft, either commercial or military, is a feature of the invention. Application of the improved CIS technology described herein requires a unique start sequence, the steps of which and approximate times of which are listed below:

1. Time 0.0 second: Inject carrier potentials and let the electromagnetic transients die away. Once the carrier potential waveform is applied, it takes some time for AC steady state to be established. Something on the order of 0.25 second should be sufficient.

2. Time 0.25 second: Activate rotor position observer and phase lock to a rotor pole. The initial estimated velocity and position are zero or within a narrow velocity band or range, such as ±200 rpm. Depending on whether or not the engine is windmilling and the final tuning and bandwidth of the rotor position observer, 0.5 second is adequate.

3. Time 0.75 second: Establish N-S and correct the estimated angle. Once the observer has locked on to a rotor pole, this may take an additional 0.25-second.

4. Time 1.25 second: Increase the frequency of the carrier signal using a controlled ramp. The best frequency for NS determination is not the best for estimating rotor position during S/G excitation and application of full torque producing currents. It is expected that the carrier frequency will be ramped up from about 100 Hz (for NS determination) up to the 500 Hz for reliable rotor position estimation while starting. The controlled ramp will require no more than 0.5 second to complete.

5. Time 2.0 second: Activate the motor controller at zero commanded torque. If the S/G is windmilling, applying excitation will produce generating currents that will perturb the CIS algorithm. The disturbance time frame is set by the S/G dynamics and not selected for controls purposes. Activating the FOC at zero current command suppresses the fundamental generating currents. Allowing the FOC initialization transient to die away shouldn't take long, but 0.5 second represents a conservative estimate.

6. Time 2.5 second: Apply excitation. Following excitation it takes some time for the electromagnetic transients to die away. At near rotor standstill, exciting the S/G drives the machine into saturation, which changes its impedances. A full second is allocated to allow all transients to completely die away before the next step is taken.

7. Time 3.5 second: Command full torque and accelerate. The torque command is ramped up from zero to full torque using a controlled ramp with a rise time of 0.5 second. The torque command is ramped instead of stepped to avoid shocking the rotor position observer and potentially causing it to lose phase lock with the rotor.

These times have not yet been optimized and are felt to be conservative. If the allocated times from the seven described steps are summed, the total elapsed time before the full commanded torque is delivered is 4.0 seconds. Thus, less than 4.0 seconds will be added to the theoretical start time due to the required CIS start sequence. Note that this start sequence describes the configuration wherein the carrier frequency is ramped from that suitable for north-south detection up to that suitable for rotor lock under the excitation and application of fundamental current transients. Use of the dual carrier frequency approach eliminates step 4 from the above sequence and shortens the time required from start initiation to the application of full torque by the allocated 0.75-second.

Described above is a carrier injection sensorless (CIS) starting control system that is capable of determining the angular position and velocity of a rotor for a wound field synchronous machine at or near rest and comprises north-south pole determination and a variable or dual frequency carrier signal for improved performance throughout the start sequence for the machine. It should be understood that the described embodiments are only illustrative implementations of the invention, that the various parts and arrangement thereof may be changed or substituted, and that the invention is only limited by the scope of the attached claims.

What is claimed is:

1. A method of determining the angular position and velocity of a rotor for a polyphase alternating current (AC) wound field synchronous machine at or near rest that is driven by a motor controller that comprises a carrier injection sensorless (CIS) position sensing system, the rotor being excited by power generated by an exciter through a rotating rectifier, comprising the steps of:
   generating polyphase AC power for the machine that has a power frequency representative of rotor angular velocity and current representative of torque;
   generating a variable frequency polyphase AC carrier signal that has a frequency substantially higher than the power frequency;
   injecting the carrier signal until electromagnetic transients die away;
   activating a rotor position observer and phase lock to a rotor pole, initially estimating rotor angular velocity and position within a narrow low velocity range;
   establishing north-south pole alignment and correcting the estimated angle;
   increasing the frequency of the carrier signal using a controlled ramp;
   activating the motor controller at zero commanded torque;
   applying excitation to the exciter; and
   applying a ramped torque command from zero to full torque to the motor controller to accelerate.

2. The method of claim 1, wherein the rotor position observer is activated approximately 0.25 second after the carrier signal is injected.

3. The method of claim 1, wherein the north-south pole alignment is established approximately 0.75 second after the carrier signal is injected.

4. The method of claim 1, wherein the frequency of the carrier signal is ramped up approximately 1.25 second after the carrier signal is injected.

5. The method of claim 1, wherein the motor controller is activated at zero commanded torque approximately 2.0 seconds after the carrier signal is injected.

6. The method of claim 1, wherein excitation is applied to the exciter approximately 2.5 seconds after the carrier signal is injected.

7. The method of claim 1, wherein the torque command is applied to the motor controller approximately 3.5 seconds after the carrier signal is injected and ramped from zero to full torque with a rise time of approximately 0.5 second.

8. A method of determining the angular position and velocity of a rotor for a polyphase alternating current (AC) wound field synchronous machine at or near rest that is driven by a motor controller that comprises a carrier injection sensorless (CIS) position sensing system, the rotor being excited by power generated by an exciter through a rotating rectifier, comprising the steps of:
   generating polyphase AC power for the machine that has a power frequency representative of rotor angular velocity and current representative of torque;
   generating a dual frequency polyphase AC carrier signal with lower and higher frequencies that are substantially higher than the power frequency;
   injecting the carrier signal until electromagnetic transients die away;

activating a rotor position observer and phase lock to a rotor pole, initially estimating rotor angular velocity and position within a narrow low velocity range;

establishing north-south pole alignment and correcting the estimated angle;

terminating the lower frequency of the carrier signal;

activating the motor controller at zero commanded torque;

applying excitation to the exciter; and applying a full torque command to the motor controller to accelerate.

9. The method of claim 8, wherein the rotor position observer is activated approximately 0.25 second after the carrier signal is injected.

10. The method of claim 8, wherein the north-south pole alignment is established approximately 0.75 second after the carrier signal is injected.

11. The method of claim 8, wherein the low frequency of the carrier signal is shut off and the motor controller is activated at zero commanded torque approximately 2.0 seconds after the carrier signal is injected approximately 1.25 second after the carrier signal is injected.

12. The method of claim 8, wherein excitation is applied to the exciter approximately 1.75 seconds after the carrier signal is injected.

13. The method of claim 8, wherein the torque command is applied to the motor controller approximately 2.75 seconds after the carrier signal is injected and ramped from zero to full torque with a rise time of approximately 0.5 second.

* * * * *